Aug. 15, 1961

D. W. McKEE

2,996,206

VEHICULAR LOADER

Filed Aug. 12, 1953

INVENTOR.
DALE W. McKEE
BY
Carlsen + Hagle
ATTORNEYS

INVENTOR.
DALE W. McKEE
BY
Carleen & Hogle
ATTORNEYS

United States Patent Office 2,996,206
Patented Aug. 15, 1961

2,996,206
VEHICULAR LOADER
Dale W. McKee, Minneapolis, Minn., assignor, by mesne assignments, to Otis Elevator Company, New York, N.Y., a corporation of New Jersey
Filed Aug. 12, 1953, Ser. No. 373,772
3 Claims. (Cl. 214—670)

This invention relates generally to improvements in traveling load handling mechanisms of the general type characterized in that loading mechanism is provided upon a vehicular frame for picking up a load alongside that frame and then lifting, transporting and lowering the load as may be required.

The preferred embodiment shown has been developed for the specific purpose of handling cargo carrying bodies such as the trailers of heavy duty, over-the-road transport vehicles which are customarily made up of a tractor unit and a trailer and which are commonly referred to as semi-trailers.

My invention has as one of its primary objects the provision of a practical loader for handling the cargo laden trailer parts of the ordinary semi-trailer equipment so that they may be placed upon and removed from the railway cars with a minimum of time and labor involved in process. My invention provides a traveling loader which while designed specifically for this purpose may, of course, have other uses not discussed herein but which are regarded as within the scope of my invention. I accordingly provide a large and heavy vehicular frame, which may be self-propelled or tractor drawn and which includes a plurality of load handling devices also so constructed and operated that semi-trailer bodies may be lifted from the ground and transported up to trackside for deposit upon railway cars. At the destination such loaders will permit the trailers to be lifted from the railway cars and transported to a point convenient for their connection to the ordinary tractor units, from which point the tractor will, of course, deliver the trailer wherever required.

A further object of my invention is to provide a vehicular loader which, while large and heavy enough for its intended purpose, is nevertheless comparatively simple and inexpensive in construction and operation and which in the various embodiments hereinafter set forth includes provisions for all necessary adjustments to accommodate the loaders in the handling of the various types and sizes of semi-trailer bodies presently in use in ordinary over-the-road transport.

These and other more detailed and specific objects will be disclosed in the course of the following specification, reference being had to the accompanying drawings, in which—

FIG. 3 is a rear end view of the loader of FIG. 2 also showing an end view of a railway car and in dotted lines illustrating the manner in which the trailer may be projected over and deposited upon the car.

The various loaders herein disclosed comprise two power operated loader mechanisms each having a load carrying fork, or element capable of being projected out to one side of the loader frame underneath a load, then elevated to pick up the load and subsequently moved horizontally and lowered to deposit the load upon the frame, the machines being thus what might be called side loaders. Due to the size and weight of the loads which it is my intention to load, transport and unload, my invention utilizes two of such side loader mechanisms located adjacent to opposite ends of the loader frame and in order to avoid the description of unnecessary details of construction it may further be noted that each power operated loader mechanisms consists of a tower which is vertically extendable by a fluid actuated motor. The towers carry the load supporting forks and the entire assemblies are supported upon the loader frame for movements transversely of the direction of travel thereof. The collapsible tower and fork mechanisms may be similar or analogous to that disclosed and claimed in the LeGrand H. Lull Patent No. 2,394,458, issued February 6, 1946, to which attention is invited for such structural details as are omitted herein.

Figure 1:
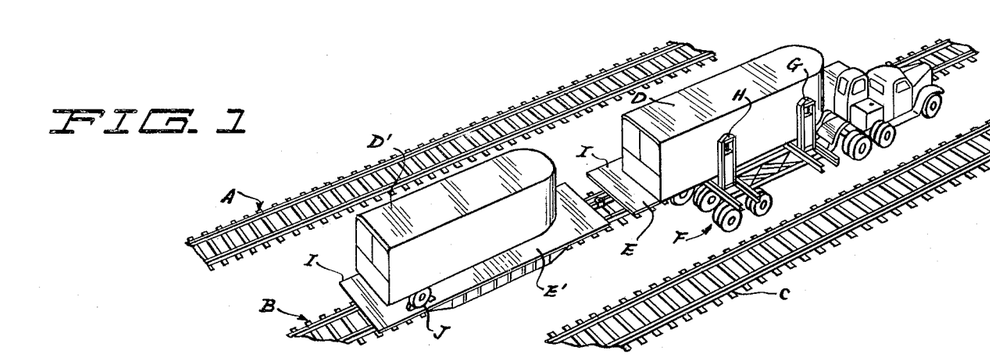
FIG. 1 is a perspective view of a portion of a railway yard illustrating the manner in which the vehicular loader of my invention is used for loading and unloading semi-trailer bodies on and off the railway cars.

Referring to the drawing FIG. 1 shows in perspective three adjacent railway tracks A, B, and C alongside one of which a loader embodying my invention is drawn up and illustrated in the act of loading or unloading a semi-trailer body or van D upon a railway car E. The loader is designated generally at F and is shown as including front and rear load carrying or manipulating devices G and H, herein sometimes referred to as loader mechanisms, the fork elements of which are engaged with the underside of the trailer D adjacent the front and rear ends thereof for safely manipulating the same as may be required. A second trailer D is shown as having been loaded upon a second railway car E' and while not material to the present invention it may be observed that the railway cars may well be ordinary flat cars having elongated, rectangular beds I provided with suitable chocks and fittings to engage the rear wheels J of the trailers, as well as the fifth wheel mechanisms thereof, so that the trailers will be properly and safely held in place for transportation over the railway system.

Figure 2:
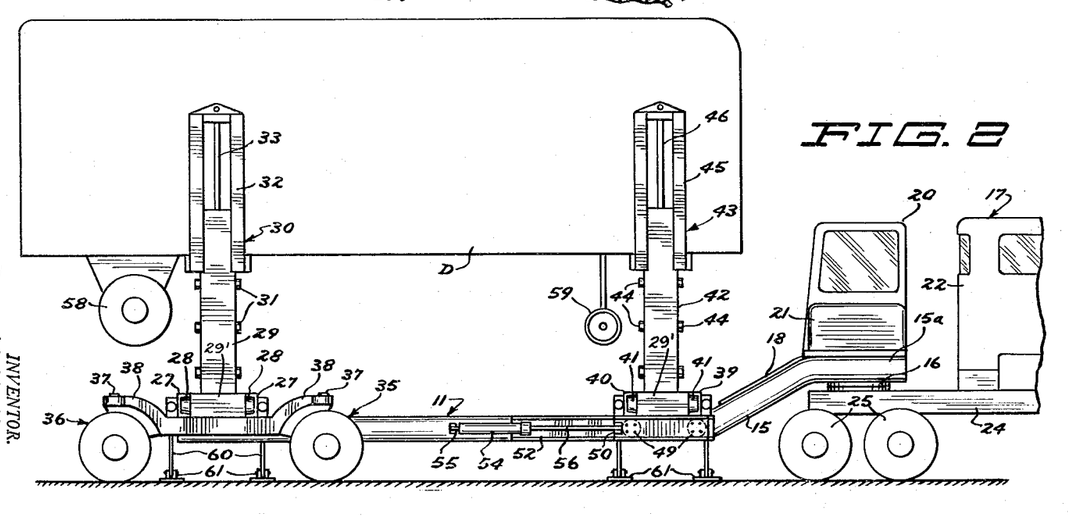
FIG. 2 is a side view of a vehicular loader according to my invention, the same being of the tractor drawn variety (only a portion of the tractor unit of which appears) and being shown as elevating and supporting a trailer unit.
Figure 4:
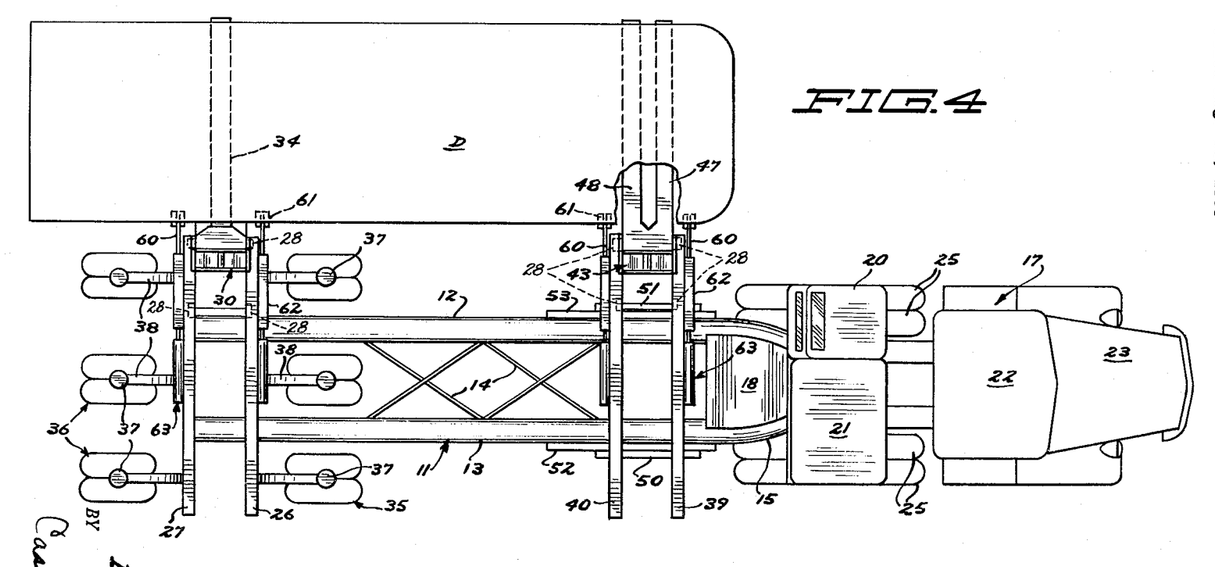
FIG. 4 is a plan view of the loader of FIGS. 2 and 3 with the trailer shown as projected out to the side.

In the embodiment of my invention as disclosed in FIGS. 2, 3, and 4 the loader comprises a main loader frame designated generally at 11 made up of a pair of parallel and longitudinally extending, heavy tubular frame members 12 and 13 which are suitably and rigidly tied together by cross trussing, as designated at 14 in FIG. 4. At their forward ends the frame members 12 and 13 angle first upwardly and then forwardly forming a gooseneck 15, the underside of which is provided with a conventional fifth wheel mechanism 16 for pivotal support on the rear end of a tractor unit, indicated generally at 17. Added stiffening is provided at the gooseneck 15 by a heavy cross plate 18 welded in place and the horizontal gooseneck extension, designated at 15a, forms a support for a cab 20 which is the operator's station for the man operating the loader itself. Also forming part of the cab 20 is an enclosure 21 in which there is an internal combustion engine or any other prime mover, as well as the associated pump, reservoir and controls (all not here shown) by which hydraulic power is developed for the operation of the loader.

In this instance the tractor unit 17 may be the ordinary unit such as now used for propelling semi-trailer, over-the road carriers and the same, of course, includes an operator's cab 22 and engine housing 23 carried upon a chassis 24 supported by suitable ground wheels, only the rear traction wheels 25 of which appear herein.

Traversing the rear end of the main frame 11 and rigidly affixed to the frame members 12 and 13 are a pair of transverse, parallel guide channels 26 and 27 which form guideways for rollers, designated collectively at 28, upon the base 29' of the mast or lower section 29 of a vertically collapsible loader tower 30. Other rollers 31 upon the sides of the tower's lower section 29 support its upper or outer section 32 for up and down movement, which movement is brought about by means of an elongated hydraulic ram or motor located in the lower section and with its vertically extensible piston rod 33 suitably connected to the upper section 32. The rollers 28 obviously provide for transverse movements of the entire tower structure in a horizontal plane and the construction may be similar to that shown in LeGrand H. Lull Patents Nos. 2,621,811 and 2,621,812. The vertically collapsible tower structure shown is similar to that of Lull Patent No. 2,394,458 as is the mounting of the load carrier or fork upon the upper tower section 32, but in this case the fork is a heavy, trussed and quite long member designated 34.

The rear end of the main frame 11 is travel supported upon forwardly and rearwardly offset rows of ground wheels, indicated at 35 and 36 respectively, each row of which consists of three dual wheels spaced apart transversely of the line of travel in order to support the relatively tremendous weight when the loader is transporting a laden trailer body, while distributing this weight over the maximum area of road surface. Each dual wheel set is arranged for dirigible movement about an upright axis, as indicated throughout at 37, by pivot connections to oppositely, forwardly and rearwardly extending and upwardly arched wheel mountings 38. Such wheel mounting elements are welded or otherwise rigidly affixed to the main frame 11 in any suitable manner and in practice provision will be made for power steering certain of such dual wheel sets while the others are permitted a free castering action, as will be necessary for the proper maneuvering of the loader.

Adjacent the forward gooseneck portion 15 of the main frame there is a second load carrier or tower and fork structure which is again made up of transversely extending heavy channels 39 and 40 forming guideways for rollers 41 which carry the lower section 42 of the front tower or power operated loader mechanism 43. Side rollers 44 support the upper section 45 of this tower for up and down movements by a second hydraulic ram, the vertically extensible piston rod of which appears at 46. This tower structure is identical to that at the rear of the loader except that the actual load carrying element or fork is bifurcated and comprises parallel heavily braced members 47 and 48 the spacing between which is such as to engage the underside of the truck body while clearing or properly engaging the fifth wheel mechanism thereof.

In the case of this forward tower and fork assembly, however, the channels 39 and 40 are not welded or otherwise secured to the main frame members 12 and 13 but instead are provided with guide rollers 49 which are carried by transversely spaced longitudinal channels 50 and 51 secured to the channels 39 and 40. These guide rollers 49 then operate in longitudinal guide channels 52 and 53 secured to the opposite outer sides of the frame members 12 and 13 so that this entire front tower assembly may be moved longitudinally upon the main frame to adjust the spacing between the respective front and rear towers. Preferably this adjustment is made hydraulically and may be conveniently brought about by the provision at the center or each side of the frame of a fluid motor cylinder 54 secured to the adjacent main frame member at 55 and having its piston rod 56 secured to the adjacent channel 50 or 51 as the case may be. The spacing adjustment between the front and rear loader towers and forks is, of course, important in order to adapt my loader to use with all of the various sizes of semi-trailer bodies currently in use.

In FIGS. 2, 3, and 4 the trailer body being manipulated is indicated at D and as clearly shown therein the rear carrier fork 34 is arranged to engage the underside of the body just forward of the trailer's rear ground wheels 58, while the bifurcated forward loader fork engages the underside of the body at the point at which the fifth wheel mechanism is located and, of course, just forwardly of the front wheel assembly 59 with which the trailers are provided for support when not connected to their tractors. Thus the weight of the trailer and its contents may be properly balanced upon the front and rear forks while at the same time the weight is well distributed between the wheels 35 and 36 of the loader and the wheels of the tractor unit 17. When thus supported upon the loader forks the trailer D may, as seen in FIG. 3, be projected laterally to one side from a position above the main frame 11 outward to a position at which the trailer is located above the bed of the railway car on which it is to be deposited. The latter position of the trailer D is designated in dotted lines at D" and it will thus be observed that by pulling up my improved loader immediately alongside the railway track the loaded trailers may be very readily deposited upon the railway cars for further transportation thereby. In FIG. 3 the railway car is again indicated by the reference character I and the same, of course, has the usual trucks by which it is travel mounted upon the tracks B. Obviously when the trailer is projected one to one side in this manner there is a considerable twisting stress placed upon the loader, tending to tilt it in the direction of the suspended load and to assist in counteracting this force the loader is provided at each of its channels 26, 27, 39 and 40 with an extensible jack 60 adapted to be projected outwardly and downwardly so that its ground engaging foot 61 will form a support for the load well outward from the adjacent side of the loader. Such jack structures are shown in the prior Lull loader patents and as here shown each jack 60 is slidably arranged in a guide channel or housing 62 secured upon the adjacent side of the cross channel with a fluid motor 63 arranged to project the jack outward and downward whenever required. When the loader is in use for transporting the trailer bodies the jacks are, of course, retracted and are pulled upwardly and inwardly into the said housing 62.

In the operation of the loader the forks 34 and 47—48 will be normally retracted and lowered to position between or slightly above the guide channels 26—27 and 39—40 and when the loader is drawn up alongside a trailer body to be loaded upon a railway car the loader towers may be moved transversely in said guide channels in order to thrust the forks beneath the trailer as it rests upon the loading surface or ground. The towers are then upwardly extended to lift the trailer body so that it may be pulled in place over the main frame of the loader for transport to a position alongside the railway car, and during such transport the trailer may be supported upon the forks or the latter may be dropped far enough to deposit the trailer upon the channels 26—27 and 39—40. In either case as the loader reaches proper position alongside the railway car the towers are elevated and then moved out transversely until the trailer body is in proper position over the car, after which the trailer is lowered and the forks retracted. It only remains then to properly fasten and chock the trailer and it will be readily understood that the operation is thus one which may be carried out with a minimum of time and labor involved.

Not only does the longitudinal adjustment of the forward loader tower 43 along the channels 52—53 provide relative spacing adjustments between the forks but the fact that in my loader there are separately operative forks enables me to control the horizontal and vertical angle of the loaded trailer bodies at will. Normally the two forks will be operated in unison but by the provision of overriding controls either fork may be raised higher than the other to thus effect a pitch adjustment of the load wherever this may be necessary. Likewise either fork may be moved horizontally with respect to the other, by a suitable overriding control, to yaw the load as may be required. The operator is thus permitted complete flexibility of control over the load and this is true in all of the embodiments of my invention herein described.

Figure 5:
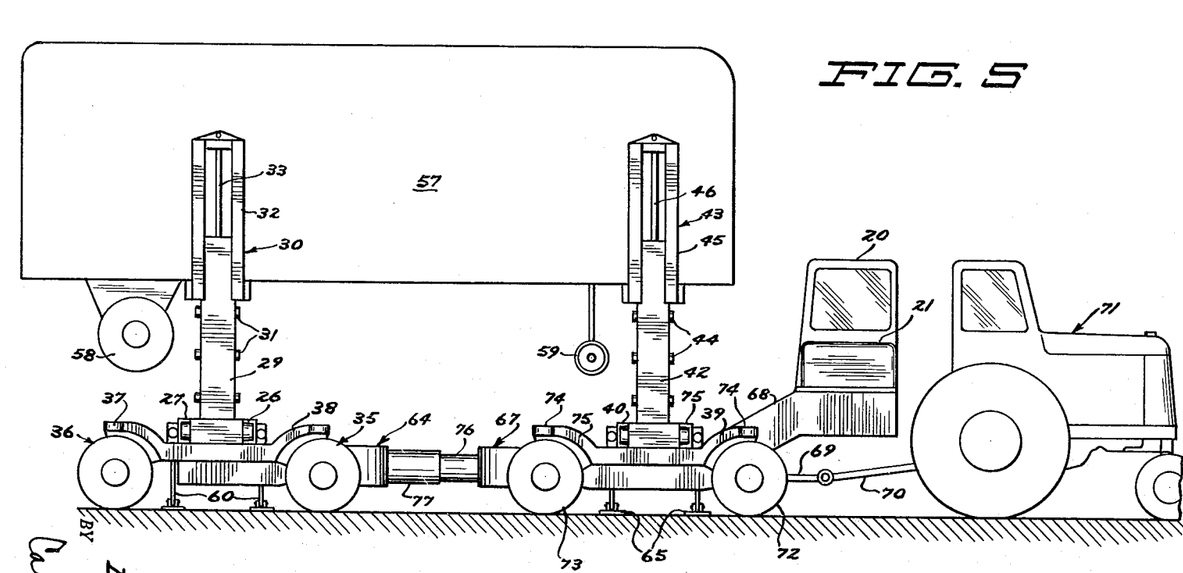
FIG. 5 is a side elevation similar to FIG. 2 but showing a modified version of the loader, which is again of the tractor drawn variety but which is characterized in that the front and rear loaders, per se, are connected by a longitudinally telescoping frame.
Figure 6:
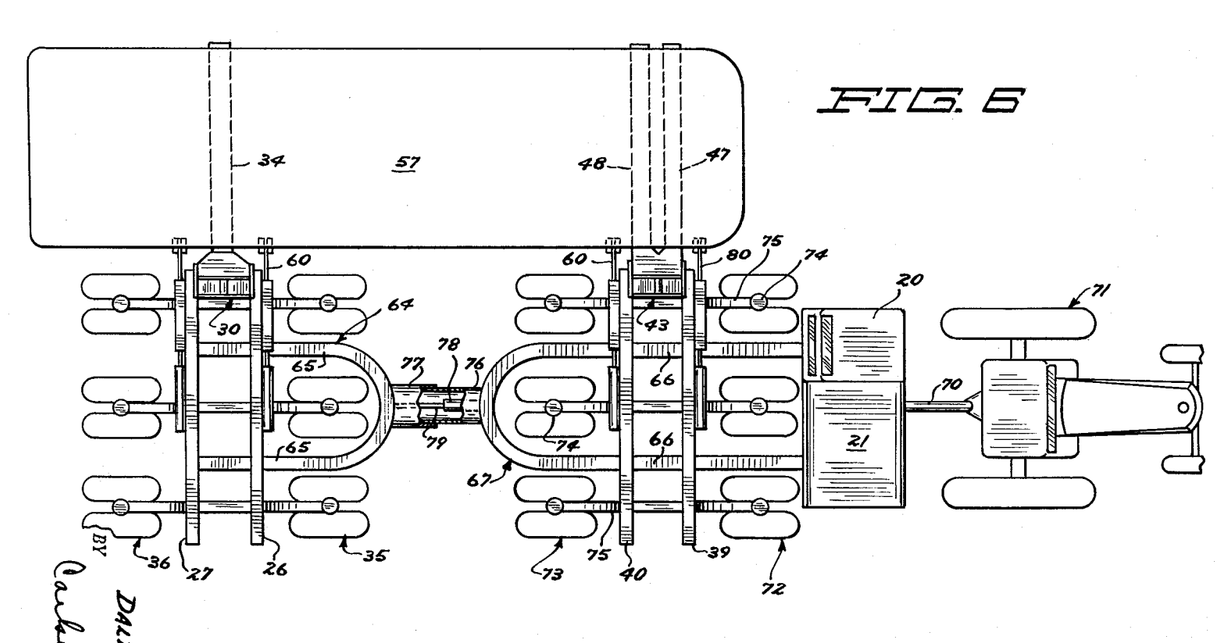
FIG. 6 is a plan view of the loader of FIG. 5 with the supported trailer projected out to one side.

The embodiment of my invention as shown in FIGS. 5 and 6, while inherently identical in principle to that just described, differs in that the main frame structure itself is arranged for effective length adjustment in order to vary the spacing between the load carriers, as well as in certain other minor respects as will now be described. Inasmuch as the front and rear tower and fork mechanisms or assemblies are identical in both embodiments corresponding reference numerals are used throughout and the same is true as to the front and rear rows 35 and 36 of ground wheels at the rear of the loader. However, the rear transverse guide channels 26 and 27 are in this case secured in parallelism to the transversely spaced arms 65 of a U-shaped rear frame member 64 while the front guide channels 39 and 40 are likewise secured in parallel positions to the relatively longer transversely spaced arms 66 of a U-shaped and reversely positioned forward frame member 67. These frame members 64 and 67 are, of course, fabricated of very heavy material and the forward member is again provided with a gooseneck extension 68 upon the upper and forward part of which is located the cab 20 and housing 21 for the operator, engine, etc., as previously described. While this loader may be provided with a fifth wheel mechanism for operation by the ordinary semi-trailer tractor it is here shown as provided with a draft tongue 69 for connection to the drawbar 70 of an ordinary industrial tractor 71 which may be used where semi-trailer tractor units are not readily available. Of course, when thus drawn by the ordinary industrial tractor additional support must be provided for the forward end of the loader frame and this is accomplished by the provision of front and rear rows 72 and 73 of ground wheels arranged and supported exactly as are the rear wheels 35—36. Also in this case provision will be made for the steering of certain of the dual wheel sets making up the front wheel suspension as well as caster action of the others for which purpose the wheels are arranged for dirigible movement about vertical pivots 74 carried by upwardly arched wheel mounting members, denoted collectively at 75. The U-shaped front and rear frame members 64 and 67 are connected together by means of telescoping, heavy tubular central frame members 76 and 77 which are slidably associated so that the said front and rear portions of the frame may be forwardly and rearwardly adjusted with respect to each other. Such adjustment, of course, brings about a corresponding adjustment of the spacing between the load carrier forks 34 and 47—48 in order to accommodate the loader for use with trailers of different sizes and lengths. In FIG. 6 I show a longitudinally arranged fluid motor as one example of means for effecting this sliding adjustment of the center frame members 76 and 77, the said motor comprising a cylinder 78 and reciprocating plunger 79 which parts are connected to the respective frame members. This fluid motor may be located in the interior of the center frame members or may otherwise be suitably arranged as desired.

Obviously the loader of this construction will permit the same convenient and rapid loading and unloading of the semi-trailer bodies as described hereinbefore. Here also the jacks 60 are provided for lateral support when the trailer bodies are thrust out to the side of the loader and otherwise the construction and operation are exactly as previously described.

Figure 7:
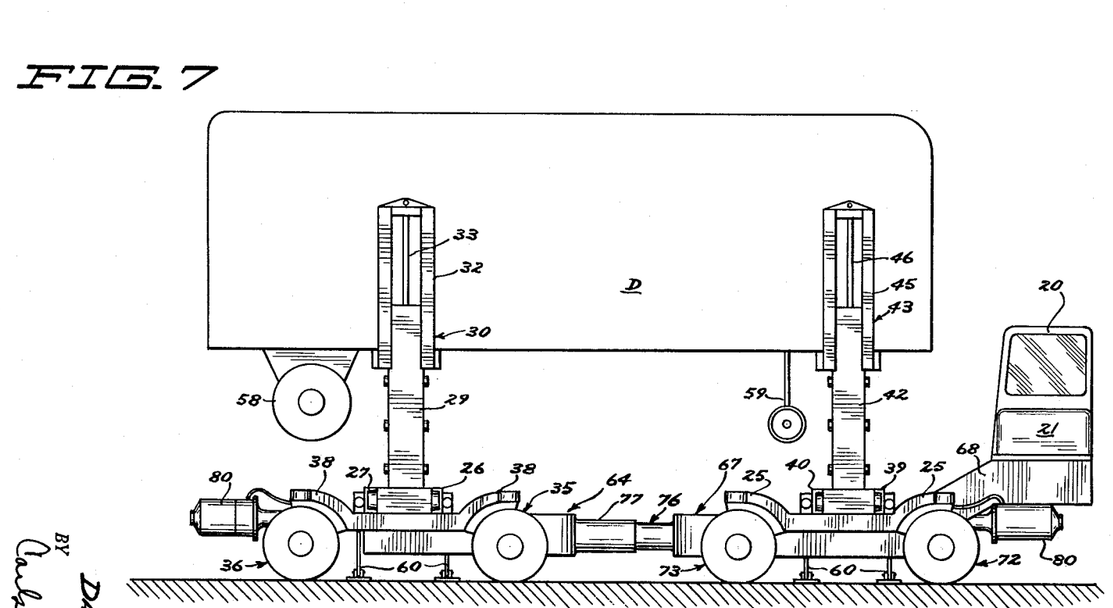
FIG. 7 is a view similar to FIG. 5 in which the loader is itself of the same basic construction but which in this case is self-propelled.

In FIG. 7 I have shown in side elevation a further modification of my loader which is essentially identical to that of FIGS. 5 and 6, with the exception that it is self-propelled. Corresponding parts are accordingly indicated throughout by the same reference characters. While any practical method of transmitting torque to the wheels 35—36 and 72—73, or any part thereof, may be employed I have illustrated here the provision of rotary fluid or electric motors 80 which may be geared to the wheels and powered by the engine in the housing 21. The minor details of the drive are not, of course, important here and are not shown.

Figure 8:
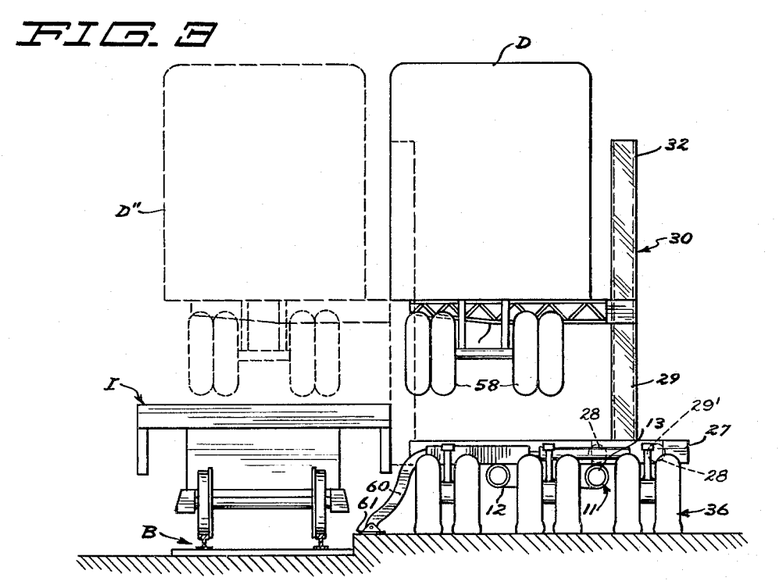
FIG. 8 is a view similar to FIG. 7 of a self-propelled loader like that shown in FIG. 7 but adapted for use upon railway rails.
Figure 9:
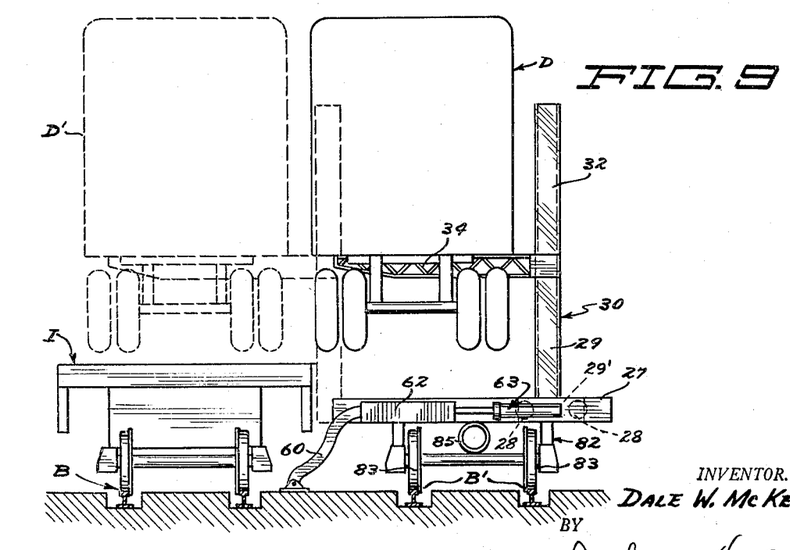
FIG. 9 is an end view of the loader of FIG. 8 as located alongside a railway car upon an adjacent track and also showing in dotted lines the manner in which the trailer may be projected over above and lowered upon the car.

A fourth modification of the loader is shown in FIGS. 8 and 9 and the same is adapted to use on railway tracks where trackage is available for the purpose. Here again parts which correspond with those of the earlier disclosures are correspondingly lettered. Fundamentally the difference, of course, lies in the substitution of front and rear railway trucks 81 and 82 for the pneumatic tired ground wheels of the other loaders, such trucks having the usual flanged wheels 83 for travel on the rails B′ as seen in FIG. 9, alongside the track B upon which the cars I are drawn up for loading and unloading. Also as here shown the main frame of the loader consists of elongated heavy center tubes 84 and 85 secured respectively to the front and rear trucks 81 and 82 and telescoped so that the spacing between the front and rear load forks may be adjusted as previously described. Also in this case provision would ordinarily be made for self-propulsion of the loader in any suitable manner.

Figure 10:
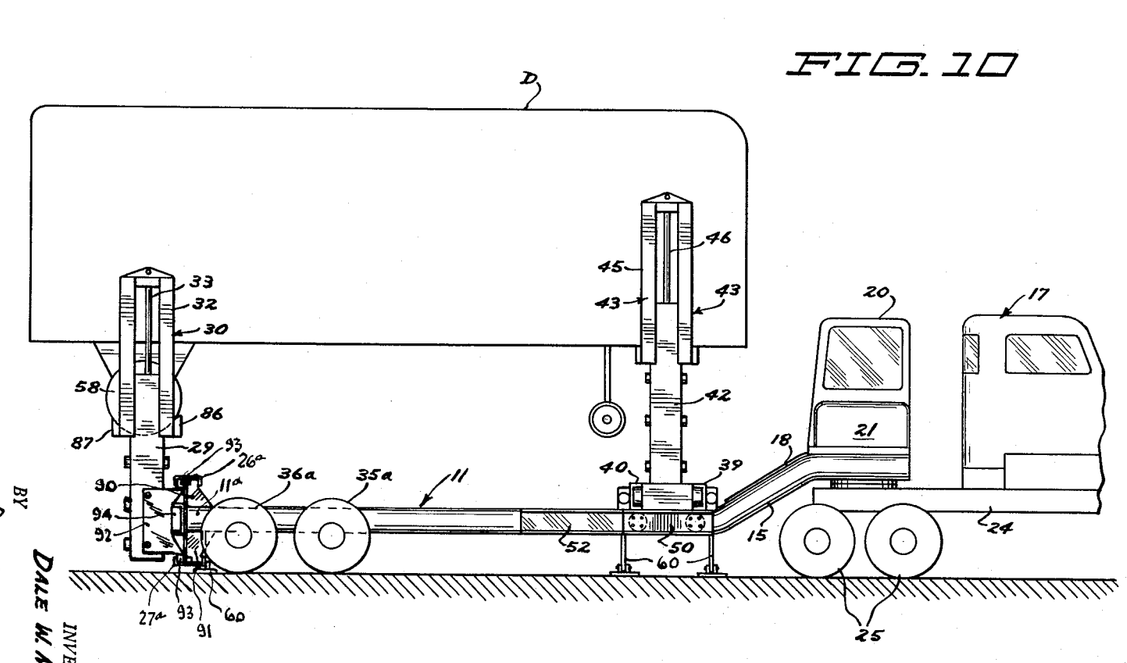
FIG. 10 is a view similar to FIG. 2 but showing another arrangement of the rearmost load carrier with the same overhanging the rear wheels of the vehicle.

Finally, in FIG. 10, I show in side elevation a fifth modification of my loader, similar as to general construction to that of FIGS. 2–4 except that, at the rear, rather close spaced front and rear rows of ground wheels 35a—36a are provided, suitably arranged forward of the rear extremity of the main frame 11 which thus has a rear overhang 11a. The rear cross channels 26a and 27a for the rear loader tower 30 may in this case be vertically spaced and secured by brackets 90 and 91 to the frame 11a and the lower section 29 of the tower secured to a bracket plate 92 having rollers 93 running in said channels. Added rollers 94 at the center between the channels 26a—27a may also be provided for further supporting the tower and the actual load handling element or fork for this loader may consist of parallel forks 86—87 shaped to engage beneath the rear wheels 58 of the trailer. Obviously where it is not practical to engage the forks beneath these wheels as here shown then a suitable fork or forks may be provided here also for engaging beneath the trailer body as previously described. Also in this modification there is a jack 60 at the rear of the machine and at the front there is the front loader tower, its mounting and jacks all as set forth hereinbefore.

It will be readily appreciated from the foregoing that I have provided, in the several embodiments making up this disclosure, a heavy duty loader capable of handling cargo laden trailers with ease and dispatch, with complete flexibility of control and adjustment to the various sizes of the trailers which may be encountered. All of these factors contribute to the solution of the only real problem, operationally, of using the railroad systems for inter-city transport of the trailers to relieve the highways of the wear and congestion now caused by over-the-road transport of so much of the nation's goods and merchandise.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A vehicular loader of the character described comprising a frame having two sets of longitudinally spaced linear guideways located entirely on and extending across its upper side, said guideways being parallel and coextensive with one another and spaced transversely of their length, a first discrete power operated loader mechanism including a mast supported by one of said sets of guideways entirely within the confines of said frame, a second discrete power operated loader mechanism including a mast supported by the other set of said guideways entirely within the confines of said frame, power means for moving said loader mechanisms lengthwise of the respective said guideways by which they are supported, and ground engaging wheels supporting said frame, each of said masts having a rigid member movable by power vertically therealong and projecting outwardly therefrom in the direction of the length of said guideways beyond all other parts of the loader mechanism whereby it may be projected in an outwardly direction beyond the frame of the loader.

2. A vehicular loader of the character described comprising an elongated frame having longitudinally spaced guideways located entirely on and extending across its upper side, power means for producing relative movement between said guideways lengthwise of said frame, discrete power operated loader mechanisms in each of said guideways, power means for moving said loader mechanisms lengthwise of said guideways, and ground engaging wheels supporting said frame, each of said loader mechanisms comprising a vertical mast having a rigid member movable vertically therealong and projecting outwardly therefrom in a direction transversely of said frame beyond all other parts of the loader mechanism whereby it may be projected in an outwardly direction beyond the frame of the loader, and power means for moving said rigid member vertically along said mast.

3. A vehicular loader of the character described comprising an elongated frame having longitudinally spaced guideways located entirely on and extending across its upper side, power means for producing relative movement between said guideways lengthwise of said frame, discrete power operated loader mechanisms in each of said guideways, power means for moving said loader mechanisms lengthwise of said guideways independent of one another, ground engaging wheels supporting one end of said frame, and means at the other end of said frame for connecting said frame to a highway tractor unit, each of said loader mechanisms comprising a vertical mast and a rigid member movable vertically therealong and projecting outwardly therefrom in a direction transversely of said frame beyond all other parts of the loader mechanism whereby it may be projected in an outwardly direction beyond the frame of the loader, and power means for moving said rigid member vertically along said mast.

References Cited in the file of this patent

UNITED STATES PATENTS

| | | |
|---|---|---|
| 647,512 | Nichols | Apr. 17, 1900 |
| 1,410,103 | Lightner et al. | Mar. 21, 1922 |
| 1,887,056 | Hunt | Nov. 8, 1932 |
| 1,910,398 | Ludington | May 23, 1933 |
| 1,919,823 | Bowling | July 25, 1933 |
| 2,008,324 | Grab | July 16, 1935 |
| 2,058,955 | Culemeyer | Oct. 27, 1936 |
| 2,121,181 | Bayerl | June 21, 1938 |
| 2,324,817 | Bratley | July 20, 1943 |
| 2,405,893 | Leftwich | Aug. 13, 1946 |
| 2,437,806 | Dempster | Mar. 16, 1948 |
| 2,461,577 | Stark | Feb. 15, 1949 |
| 2,591,544 | Hegarty | Apr. 1, 1952 |
| 2,621,811 | Lull | Dec. 16, 1952 |
| 2,621,812 | Lull | Dec. 16, 1952 |
| 2,629,507 | Olson | Feb. 24, 1953 |
| 2,647,647 | Alimanestiano | Aug. 4, 1953 |
| 2,667,980 | Dawson | Feb. 2, 1954 |
| 2,672,997 | Merck | Mar. 23, 1954 |
| 2,720,993 | Lull | Oct. 18, 1955 |
| 2,929,524 | Carlson et al. | Mar. 22, 1960 |

FOREIGN PATENTS

| | | |
|---|---|---|
| 1,024,926 | France | Jan. 10, 1953 |